United States Patent [19]
Trosch

[11] 3,832,990
[45] Sept. 3, 1974

[54] PORTABLE BROILER

[76] Inventor: Charles P. Trosch, P.O. Box 919, Oak Park, Ill. 60303

[22] Filed: Apr. 16, 1973

[21] Appl. No.: 351,165

[52] U.S. Cl............................. 126/41 R, 126/198
[51] Int. Cl........................ A47j 37/00, F24c 5/08
[58] Field of Search...... 126/41 R, 275, 25 R, 41 D, 126/98; 99/389, 401

[56] References Cited
UNITED STATES PATENTS

| | | | |
|---|---|---|---|
| 1,998,944 | 4/1935 | Spake | 126/41 X |
| 2,040,479 | 5/1936 | Glore | 126/41 X |
| 2,218,961 | 10/1940 | Schulz | 126/41 R X |
| 2,314,249 | 3/1943 | Sherman | 126/41 X |
| 3,103,160 | 9/1963 | Forniti et al. | 126/41 X |

FOREIGN PATENTS OR APPLICATIONS

| | | | |
|---|---|---|---|
| 18,070 | 3/1935 | Austria | 126/41 |
| 2,554 | 1/1894 | Great Britain | 126/41 |
| 13,007 | 8/1902 | Great Britain | 126/41 |

*Primary Examiner*—William F. O'Dea
*Assistant Examiner*—Harold Joyce
*Attorney, Agent, or Firm*—Gary, Juettner, Pigott & Cullinan

[57] ABSTRACT

A completely portable broiler which comprises an enclosure having a single gas burner located above a heat retaining metal casting assembled in the bottom of the enclosure, which upon being preheated, permits food to be cooked on both sides simultaneously without the flame touching the food, or without burning any liquid, such as fat, which is emitted from the food while cooking. The enclosure includes a door at one side together with openings to enable upward ventilation through the oven while cooking, aided by exhaust openings along the top of the rear wall.

4 Claims, 4 Drawing Figures

PATENTED SEP 3 1974
3,832,990
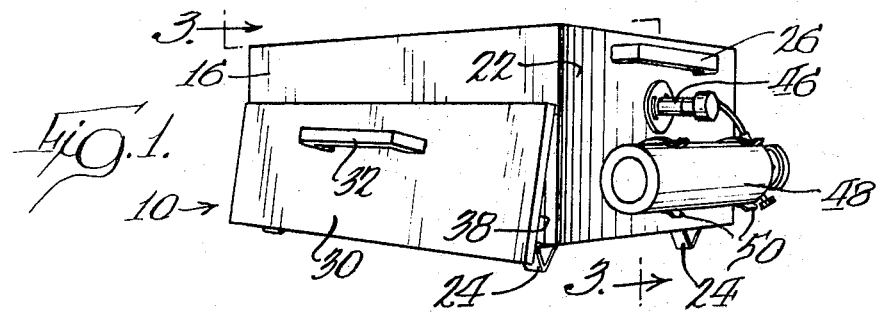
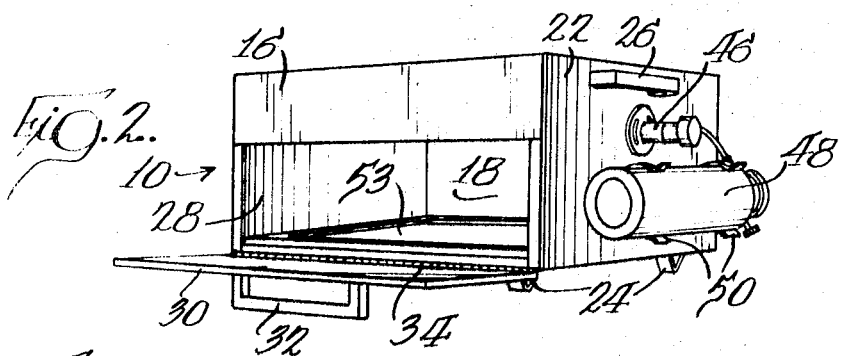
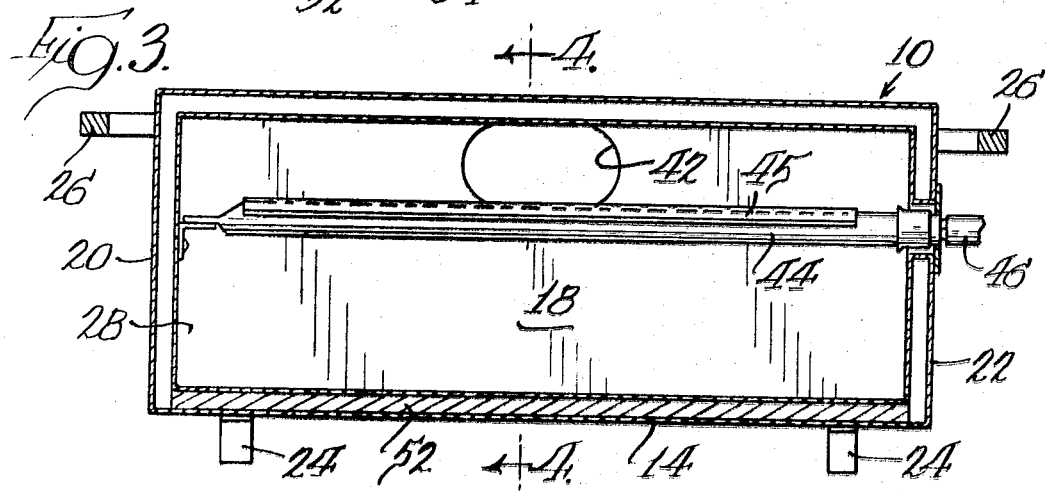
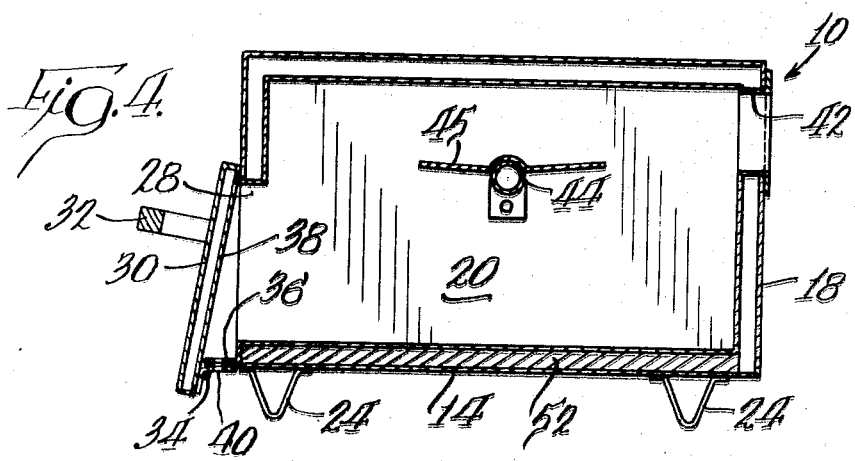

PORTABLE BROILER

BACKGROUND OF THE INVENTION

Of the various methods which are used for the cooking of foods, many are undesirable from a viewpoint of good health. For example, a quantity of fat is sometimes added to food while cooking, thereby increasing the fat and cholesterol content, and a high level of cholesterol has been implicated experimentally as a factor in arteriosclerosis. Cooking of foods, especially meats, over an open flame, whether gas or charcoal, causes fats to drip into the fire and produce harmful gases which infuse into the food, and there is experimental evidence that charcoal cooked foods contain carcinogens.

SUMMARY OF THE INVENTION

The present invention provides a convenient and portable broiler and method of cooking wherein the food is not touched by a flame, and wherein the food is allowed to cook in its own natural juices, thereby retaining its original vitamins and true flavor. In accordance with the present invention, the food is placed in pans or earthenware with the flame located above the utensil. Cooking is carried out in an enclosure having vent openings to remove noxious gases. As a result, there is no need to add fats or oils to the food, since the food cooks in its own juices, and no foreign or harmful substances are introduced into the food by virtue of the cooking process. Further, fowl and fish are cooked without the use of greasy batter, such as required in deep vat methods, thereby making the present process much healthier.

THE DRAWINGS

FIG. 1 is a perspective view of the portable broiler of the present invention, shown with the door in closed position, and FIG. 2 is a similar view showing the door in open position, revealing the interior thereof;

FIG. 3 is a sectional view taken along section line 3—3 of FIG. 1; and

FIG. 4 is a sectional view taken along section line 4—4 of FIG. 3.

DESCRIPTION OF THE PREFERRED EMBODIMENT

As shown in the figures, the portable broiler is preferably in the form of a rectangular enclosure 10 comprising a top wall 12, bottom wall 14, front and rear walls 16 and 18, and end walls 20 and 22. The construction is preferably of double wall thickness, as shown, and insulation may be provided between inner and outer walls to better retain heat within the enclosure and permit operation in cold weather.

As shown, the bottom wall 14 of the enclosure is supported on a plurality of legs 24 located at each corner, which may be of V-bent construction, and a pair of handles 26 may be provided on the respective end walls 20 and 22 near the top edge of the enclosure, to enable moving of the broiler from one location to another.

An opening 28 is provided in the front wall 16 of the enclosure in order to gain access to the interior, where cooking is accomplished. A door 30 having an insulated handle 32 near the top edge is provided over the opening 28 and is pivotally connected, by means of hinges 34, to a strip 36 (FIG. 4) projecting from the bottom wall 14.

As shown in FIGS. 1 and 4, the top edge of the door 30, when in closed position, rests against the front wall 16, while the lower edge is spaced by the width of the strip from the front wall, thereby establishing triangular intake ventilation openings 38 into the interior at both sides of the door. Since the door is tilted over slightly when in closed position, it remains closed by the forces of gravity and no fasteners are required. In addition, a plurality of openings 40 (FIG. 4) may be provided in the strip 36 for additional air intake.

As shown in FIGS. 3 and 4, one or more outlet openings 42 are provided in the rear wall 18 near the top edge thereof. In the normal operation of the broiler, air enters through the lower forward portion of the broiler through the openings 38 and 40, and is exhausted, together with combustion gases, through the rear outlet 42. As will be herein more fully described, the arrangement is such, that the combustion gases do not come into contact with the food being cooked.

The interior of the broiler contains a single specially designed burner unit 44 extending and supported between the end walls 20 and 22, with a wing design shield 45 placed on top of the burner to cause reflection of the heat. The burner is spaced above the interior surface of the bottom wall 14 and is connected via a suitable pipe 46 to an externally located supply of combustible gas, which as shown in FIGS. 1 and 2, may comprise a conventional container of bottled and regulated gas 48 removably attached to the exterior surface of the side wall 22 by means of suitable compression clamps 50. It will be obvious that the contained gas supply need not be attached to the broiler and may be situated at a remote location and attached to the burner by a flexible hose. Alternatively, the burner may also be connected to natural gas fixture, if desired.

As shown in FIG. 3, the broiler is provided with a heat retaining metal base plate 52, constructed of cast iron or aluminum, which is adapted to fit in the space between the exterior and interior surfaces of the bottom wall 14. The base, if desired, may be secured in the bottom interior wall by means of rivets or the like. In the alternative, as shown in FIG. 2, a removable heavy metal pan 53 may be placed on the bottom wall 14 beneath the burner 44, and said pan may be raised at the rear to allow food drippings to accumulate near the front.

In operation, the burner 44 is ignited, in order to warm the interior of the oven and to heat the metal base 52 or pan 53 to cooking temperature. The door 30 is now opened, and food, such as meat, fowl or fish is deposited in the pan 53 or in a cooking utensil in the case of the configuration shown in FIG. 3, and the pan or utensil is placed on the interior bottom wall surface and the door is again closed. The burner is preferably situated about four inches above the pan, but in any event, is spaced above the level of the food, such that the food is cooked simultaneously on both sides, thereby avoiding the necessity of turning the food while cooking.

It may be seen that since the burner is located above the food, the drippings from the food do not come into contact with the flame, but rather collect in the pan to fortify the moisture and flavor of the food as it is being cooked. In addition, no noxious gases or smoke are produced by this cooking method, and any combustion gases and volatile materials are drawn upwardly away from the food and are vented by the flow of air from the inlet openings 38 and 40 to the outlet 42.

I claim:

1. A portable broiler for cooking food comprising an enclosure, a single gas burner within the top of the enclosure, deflector means on said burner for deflecting heat toward the bottom of said enclosure, means for supplying combustible gas to said burner, a cast metal, heat retaining base within said enclosure spaced beneath said burner, a door in one side of said enclosure, said door being pivotally connected along its bottom edge to said enclosure, and when closed, being spaced near the bottom edge thereof from said enclosure to allow entrance of air thereinto, an outlet vent hole in the upper side portion of said enclosure opposite to said one side having said door, whereby fresh air is circulated from a lower portion of said enclosure through an upper portion thereof, said base accommodating placement of food in cooking containers thereon for simultaneous cooking of food on one side by said burner and on the other side by said base, said single burner providing the sole source of heat in said broiler.

2. The portable broiler of claim 1 wherein said door is pivotally mounted on a strip projecting near the bottom of said enclosure.

3. The portable broiler of claim 2 wherein said strip has a plurality of vent holes therein.

4. The portable broiler of claim 1 wherein the means for supplying said unit with combustible gas comprises a container of bottled gas removably attached to the exterior of the enclosure.

* * * * *